United States Patent
Sakuranaga et al.

[11] Patent Number: 6,121,040
[45] Date of Patent: Sep. 19, 2000

[54] PROCESS FOR REMEDIATION OF CONTAMINATED SOIL

[75] Inventors: Masanori Sakuranaga; Kinya Kato, both of Atsugi, Japan

[73] Assignee: Canon Kabushiki Kaisha, Tokyo, Japan

[21] Appl. No.: 09/208,376

[22] Filed: Dec. 10, 1998

[30] Foreign Application Priority Data

Dec. 11, 1997  [JP]  Japan .................................. 9-341524

[51] Int. Cl.⁷ .................................................. B09B 3/00
[52] U.S. Cl. ...................... 435/262.5; 166/246; 405/128; 588/249
[58] Field of Search .............................. 435/262, 262.5; 166/246, 270; 405/128; 588/249

[56] References Cited

U.S. PATENT DOCUMENTS

| | | | |
|---|---|---|---|
| 3,759,329 | 9/1973 | Ross | 166/308 |
| 4,401,569 | 8/1983 | Jhaveri et al. | 210/610 |
| 4,442,895 | 4/1984 | Lagus et al. | 166/250 |
| 4,877,736 | 10/1989 | Fliermans | 435/183 |
| 4,925,802 | 5/1990 | Nelson et al. | 435/262 |
| 5,032,042 | 7/1991 | Schuring et al. | 405/258 |
| 5,111,883 | 5/1992 | Savery | 166/269 |
| 5,133,625 | 7/1992 | Albergo et al. | 405/263 |
| 5,227,470 | 7/1993 | Kanno et al. | 530/359 |
| 5,730,550 | 3/1998 | Andersland et al. | 405/128 |
| 5,866,003 | 2/1999 | Okubo et al. | 210/610 |

FOREIGN PATENT DOCUMENTS

| | | |
|---|---|---|
| 0 715 903 | 6/1996 | European Pat. Off. . |
| 0 785 035 | 7/1997 | European Pat. Off. . |
| 61-250085 | 11/1985 | Japan . |
| 2-92274 | 4/1990 | Japan . |
| 2-26666 | 6/1990 | Japan . |
| 3-292970 | 12/1991 | Japan . |
| 6-70753 | 3/1994 | Japan . |
| 6-227769 | 8/1994 | Japan . |
| WO 95/29772 | 11/1995 | WIPO . |

OTHER PUBLICATIONS

Patent Abstracts of Japan, Vol. 1995, No. 11, Dec. 1995.

*Primary Examiner*—David A. Redding
*Attorney, Agent, or Firm*—Fitzpatrick, Cella, Harper & Scinto

[57] ABSTRACT

Provided is a process for remedying a contaminated soil characterized in that a contaminated region of the ground is purified by the steps of first freezing the contaminated region, then injecting to the same a microorganism and a liquid agent or gas which is required for a biological treatment using the microorganism's ability to decomposing a pollutant, to enable more efficient and rapid remediation.

20 Claims, 5 Drawing Sheets

PROCESS FOR REMEDIATION OF CONTAMINATED SOIL

BACKGROUND OF THE INVENTION

Field of the Invention

The present invention relates to a process for the remediation of the environment (for example, soil, groundwater etc.) polluted with contaminating compounds such as hydrocarbons, halogenated hydrocarbons etc. using a microorganism.

Recently, pollution of the environment such as soil and groundwater system with petroleum, aromatic hydrocarbons, or hydrocarbons such as paraffin and naphthene has been recognized. Also, the seriousness of the environmental pollution caused by organic chlorinated compounds such as trichloroethylene, tetrachloroethylene, tetrachloroethane and poly(biphenyl chloride) has been pointed out. In this situation, it is strongly desired to establish technologies to prevent the pollution from spreading and to remedy the polluted environment.

Various soil remediation processes have been proposed and carried out to restore the polluted soil to the original conditions by removing the pollutant from the soil. These soil remediation processes mainly use physical/chemical techniques such as vacuum extraction, sun-drying, aeration and oxidation. Also, processes using microorganisms capable of decomposing the contaminating compounds (bioremediation) have been studied. One of the typical bioremediation processes is so-called "indigenous microorganism stimulation method" (for example, U.S. Pat. No. 4,401,569 to Groundwater Technology Systems, Inc.) which treats a contaminated soil by enhancing the growth of the microorganisms capable of decomposing a pollutant, inhabiting the contaminated soil, and this process has already come into practical use in the remediation of petroleum contaminated soil. Another typical bioremediation process is to inject pollutant-degrading microorganisms into the contaminated environment, with or without at least one of an inducer which can induce expression of pollutant-degrading activity of the microorganism and a nutrient for supporting the growth of the pollutant-degrading microorganism. Compared to the conventional physical/chemical processes, such bioremediation processes can achieve remediation with low energy consumption and simple equipment. In addition, these processes can remedy the environment where the pollutant concentration is too low to be treated with physical/chemical processes.

In such a bioremediation process, it is necessary to inject a microorganism, an inducer, nutrients etc. into the environment, and how uniformly these substances can be injected into the contaminated environment is one of the requirements which decide the efficiency of a bioremediation process.

Several methods have been disclosed on injection of necessary materials into the environment. For example, U.S. Pat. No. 5,133,625 describes the method of controlling injection pressure using an extensible injection pipe while measuring the injection pressure, flow rate and temperature. This method aims to keep decomposing activity of microorganism optimum by controlling the concentration of the microorganism and nutrients by adjusting the injection pressure. U.S. Pat. No. 4,442,895 and U.S. Pat. No. 5,032,042 disclose the method where the soil is cracked by injecting a gas or a liquid from an injection well by applying pressure, and it says that oxygen and nutrients required for microbial purification can be supplied in this step.

As an intensive method for remedying a highly contaminated region in order to achieve an efficient microbial remediation within a short period, there are methods to define the range of injection of a microorganism and nutrients. For example, U.S. Pat. No. 5,111,883 discloses the method of injecting liquid chemicals into the soil at horizontally and vertically determined sites by setting the relative position of injection well and extraction well. This method aims to provide a process for injecting liquid agents into a limited area of the soil in a geometrical manner. It is considered as a very useful method when applied to microbial remediation of soil because it can define the area of the soil to be remedied.

In order to inject microorganism or substances for maintaining high decomposing activity of a microorganism into a limited area of soil, one of the methods is to form an impermeable layer as a barrier in the soil at a certain distance from the injection well. Conventionally known methods to form such an impermeable layer include laying plastic sheets or forming an asphalt layer in the soil, and injecting the soil with a treating agent such as cement, water-glass, urethane, acrylic amide, acrylate and so on. Japanese Patent Publications No. 2-26662 and No. 5-27676 disclose a method of forming an impermeable layer in a certain soil area using a water soluble polymer which turns water insoluble due to the ions in the soil. This method provides an impermeable layer as a barrier which limits the movement of substances and could be applicable to the process for injecting microorganism and nutrients into the limited area of the soil. An efficient and uniform injection of a liquid agent into a specific region has been attempted by using such region-defining means.

SUMMARY OF THE INVENTION

The present invention was made based on the background art described above. The purpose of the present invention is to achieve uniform distribution of at least one of a microorganism capable of decomposing the pollutant (herein after referred as a pollutant-decomposing microorganism), an inducer for making a pollutant-decomposing microorganism express the decomposing ability and a nutrient for a pollutant-decomposing microorganism in the polluted soil for the bioremediation thereof.

To achieve the above purpose, one embodiment of the present invention is a method for soil-remediation which comprises a step of introducing into a soil polluted with a pollutant, at least one of a microorganism capable of decomposing the pollutant, an inducer for making a microorganism capable of decomposing the pollutant express the ability to decompose the pollutant, and a nutrient for a microorganism capable of decomposing the pollutant, and a step of freezing the soil.

The present invention was made based on the present inventors' finding during soil remediation experiments using microorganisms that the pollutant decomposition efficiency was remarkably promoted when the polluted soil was first frozen and then a liquid containing a pollutant-decomposing microorganism was injected into the soil in a container.

The reason why the soil remediation efficiency is promoted according to this embodiment is not clear, but the possible explanation is as follows: When the soil is first frozen and then slowly thawed as a pretreatment, freeze expansion in the pore space will widen the fine pore space of the soil into which a liquid agent will diffuse, and agitation of the soil water retained between the soil particles by freezing and thawing will accelerate the contact between the injected liquid agent and the soil water. As described later, the freezing method well known in the art of civil engineering may cause swelling on freezing, and dehydration consolidation on thawing in the soil containing fine soil. Such a change in the soil is a problem to be overcome in civil engineering works, but suitable for the uniform distribution of a microorganism in the present invention. In other words, by adopting this freezing step described above as a pretreatment step to secure the space for the microorganism to be introduced and to increase the contact frequency between the microorganism and the pollutant, the present invention can promote the remediation efficiency and shorten the soil remediation period.

DETAILED DESCRIPTION OF THE INVENTION

Figure 1:
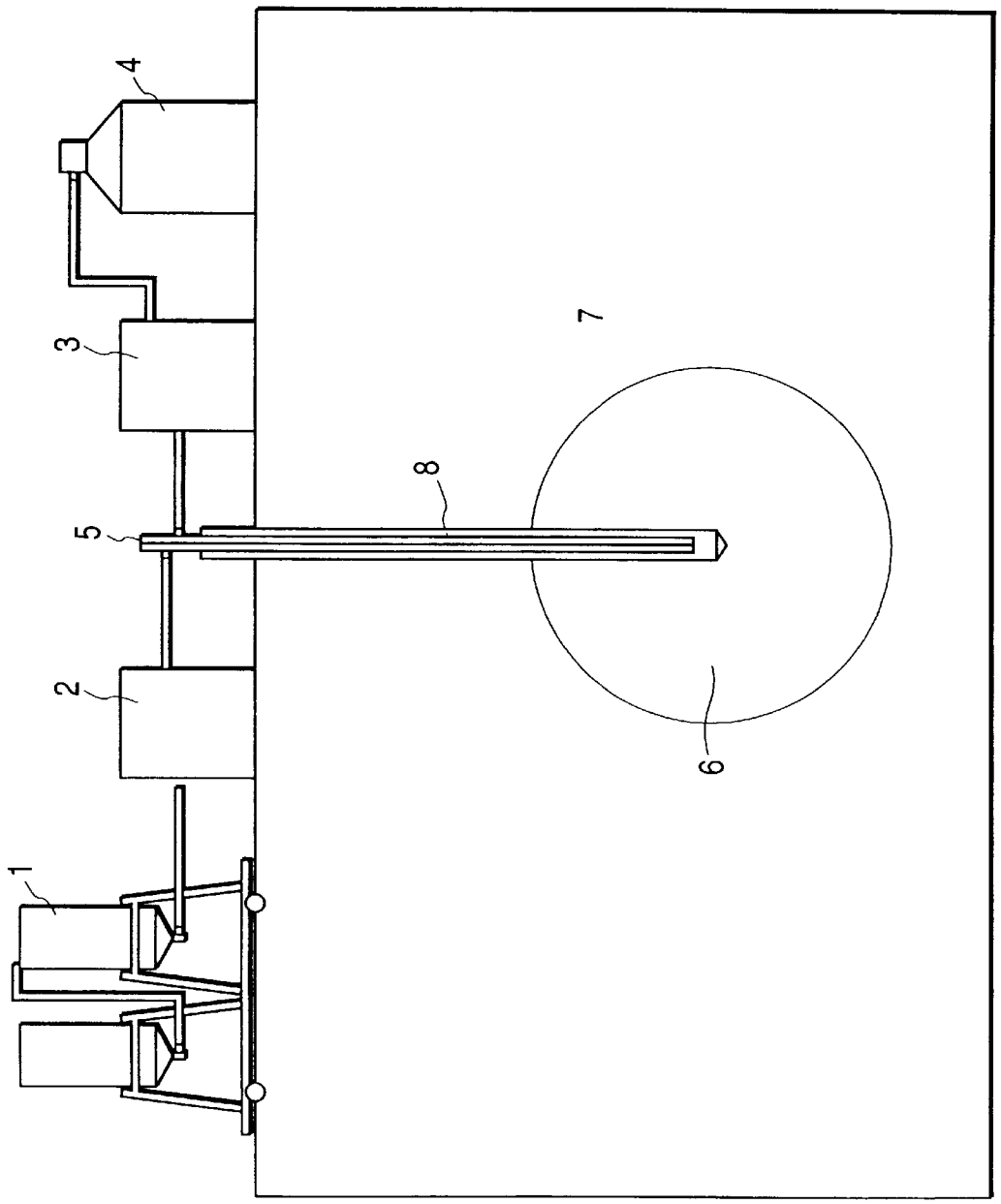
FIG. 1 is a schematic diagram illustrating a first embodiment of the present invention.

FIG. 1 is a schematic diagram illustrating one embodiment of the present invention.

Region 7 of a contaminated soil to be remedied is previously determined based on the boring data etc. Then prepared are a container 1 containing a liquid agent to be injected into region 7, an injection system 2 consisting of a pump and a flow meter, a refrigerant supply source 4, and a feeder 3 for supplying the refrigerant, as well as a freeze pipe connected to the feeder 3 to freeze the soil, and an injection pipe connected to the injection system 2 for injecting the liquid agent into the soil. A pipe 5 containing inside the freeze pipe and the injection pipe is built in a well 8 dug in the region 7 to be remedied. As shown in FIG. 1, if the injection pipe and freeze pipe are both built in the same well, the frozen region 6 and the region to be injected with the liquid agent will overlap conveniently. However, as long as the both regions overlap each other, these pipes may be independently built into different wells. As described below, by using an injection pipe having an injection opening of which position is movable along the length, and a semi-fixed freeze pipe, the region to be frozen and subjected to the liquid agent injection can be changed in depth to carry out the present remediation process while varying depth in the soil.

To freeze the soil, brine or liquid nitrogen can be used as in civil engineering works.

In the brine freezing method, an antifreeze fluid known as brine (a calcium chloride solution) is cooled to −20° C. to −30° C., and then the fluid is fed into a freeze pipe by a circulating pump to cool the soil. Then the brine whose temperature has risen by freezing the soil is sent back to a freezing system comprised of a compressor, a condenser and a cooler to carry out freezing continuously.

When liquid nitrogen (evaporation temperature −196° C.) for freezing is used, a cylinder or tank truck containing liquid nitrogen is prepared, and liquid nitrogen is allowed to flow directly in the freeze pipe to cool the soil by depriving of the evaporation heat.

Since both of the above freezing processes are employed in civil engineering works, the same machinery and materials can be used conveniently.

To thaw the frozen soil, the frozen soil may be left at ambient temperature or rapidly thawed in a heating step. Although it is not depicted in FIG. 1, it is also useful to build a heating pipe into the same well with the injection and freeze pipes to accelerate thawing. Thawing may also be conducted by injecting warm water from the injection pipe.

In the present embodiment, it is possible to inject a liquid agent containing a microorganism etc. while the soil is still frozen, and it is also possible to thaw the soil by the temperature of the injected liquid agent. Therefore, thawing of the frozen soil is not an indispensable step. If the decomposition characteristics of a microorganism is expressed in a lower temperature range than usual, partially frozen soil is preferable.

Although in the above explained constitution a well is bored into the contaminated soil, the present invention is not limited to such an embodiment. It is easier to carry out the step of freeze and thawing with the surface soil, and the same soil remediation efficiency can be obtained. Also, the soil-freezing method is not limited particularly. In addition to the use of a freeze pipe. the refrigerant may be directly added to or sprayed on the soil to freeze the soil.

Although it is not depicted in FIG. 1, an injection pipe for jetting water or air can be built into the well to reach the ground layer and cracks can be formed by applying and releasing a pressure.

The present invention is very effective to treat a pollutant existing among soil particles or in the soil water between soil particles, but not limited to a specific type of pollution. The examples of the pollutants include organic chlorinated compounds such as trichloroethylene, tetrachloroethylene, dichloroethylene and PCB; oil or petroleum hydrocarbons; and aromatic hydrocarbons.

A liquid agent to be introduced to the soil comprises at least one agent selected from a pollutant-decomposing microorganism; a nutrient including carbon, phosphorus, nitrogen etc., required for the growth of a pollutant-decomposing microorganism and for the activity-maintenance thereof; an inducer of a pollutant-decomposing enzyme; oxygen; other trace substances; a surfactant; and the other additives. According to the present invention, it does not matter whether the pollutant-decomposing microorganism is aerobic or anaerobic, indigenous or foreign, and the present invention is not limited to a specific type of microorganisms.

The microorganism can be injected in the resting state or in the growth phase. Any microorganisms may be used as long as they have an ability to decompose the pollutant. It is not limited to an isolated or identified microorganism, and it may be also used a mixed liquid culture or an enrichment culture in the presence of a pollutant.

Reported examples of the isolated microorganisms capable of decomposing TCE are *Welchia alkenophila* sero 5 (U.S. Pat. No. 4,877,736, ATCC 53570), *Welchia alkenophila* sero 33 (U.S. Pat. No. 4,877,736, ATCC 53571), Methylocystis sp. strain M (Agric. Biol. Chemi., 53, 2903 (1989), Biosci. Biotech. Biochemi., 56, 486 (1992), 56, 736 (1992)), *Methylosinus trichosporium* OB3b (Am. Chem.

Soc. Natl. Meet. Dev. Environ. Microbiol., 29, 365 (1989), Appl. Environ. Microbiol., 55, 3155 (1989), Appl. Biochem. Biotechnol., 28, 877 (1991), Japanese Patent Application Laid-Open No. 02-92274, Japanese Patent Application Laid-Open No. 03-292970), Methylomonas sp. MM2 (Appl. Environ. Microbiol., 57, 236 (1991)), *Alcaligenes denitrificans* ssp. *xylosoxidans* JE75 (Arch. microbiol., 154, 410 (1990)), *Alcaligenes eutrophus* JMP134 (Appl. Environ. Microbiol., 56, 1179 (1990)), *Mycobacterium vaccae* JOB5 (J. Gen. Microbiol., 82, 163 (1974), Appl. Environ. Microbiol., 54, 2960 (1989), ATCC 29678), *Pseudomonas putida* BH (Gesuido Kyokai Shi (Journal of Japan Sewage Worked Associations)), 24, 27 (1987)), Pseudomonas sp. strain G4 (Appl. Environ. Microbiol., 52, 383 (1986), ibid. 53, 949 (1987), ibid. 58, 951 (1989), ibid. 56, 279 (1990), ibid. 57, 193 (1991), U.S. Pat. No. 4,925,802, ATCC 53617 (first classified as *Pseudomonas cepacia*, but changed to Pseudomonas sp.), *Pseudomonas mendocina* KR-1 (Bio/Technol., 7, 282 (1989)), *Pseudomonas putida* F1 (Appl. Environ. Microbiol., 54, 1703 (1988), ibid. 54, 2578 (1988)), *Pseudomonas fluorescens* PFL12 (Appl. Environ. Microbiol., 54, 2578 (1988)), *Pseudomonas putida* KWI-9 (Japanese Patent Application Laid-Open No. 06-70753), *Pseudomonas cepacia* KK01 (Japanese Patent Application Laid-Open No. 06-227769), *Nitrosomonas europaea* (Appl. Environ. Microbiol., 56, 1169 (1990)), *Lactobacillus vaginalis* sp. nov. (Int. J. Syst. Bacteriol. 39, 368 (1989), ATCC 49540).

In addition to the above listed microorganisms, there are strain J1 (International Deposition Number based on Budapest Treaty: FERM BP-5102) and strain JM1 (FERM BP-5352) which is a mutant strain derived from strain J1. Both strains are capable of decomposing organic chlorinated compounds such as trichloroethylene; strain J1 requires an inducer for decomposing organic chlorinated compounds but JM1 does not.

Microorganisms capable of decomposing oil and petroleum hydrocarbons and aromatic hydrocarbons include Pseudomonas; Flavobacterium; Alcaligenes; and Achromobacter; or gram-positive rods and cocci, for example, Brevibacterium; Corynebacterium; Arthrobacter; Bacillus; and Micrococcus. In addition, Mycobacterium; Nocardia; Streptomyces are included, as well as marine yeast Candida sp. strain S1EW1 (FERM P-13871). There are also commercially available microorganisms including PETROBAC (POLYBAC CORPORATION), HYDROBAG (POLYBAC CORPORATION), MICRO PRO "TPH" (POLYBAC CORPORATION), BI-CHEM DC 2000GL (SYBRON CHEMICALS INC.), BI-CHEM DC 2001 LN (SYBRON CHEMICALS INC.), ABR (SYBRON CHEMICALS INC.), H-10 (Bio-Rem), BioGEE (BioGEE), LRC-1 (LRC Technologies), ERS Formula (Environmental Bio-Remediation International Corp.). These microorganisms are all applicable to the present invention.

Some microorganisms assimilate methane. In that case, it is useful to inject methane gas into the soil. When an aerobic microorganism is used, it is useful to feed air to supply oxygen to the soil.

When a liquid agent is injected into the soil through a well, it can be easily fed into the soil by applying a pressure via an injection pipe.

Figure 2:
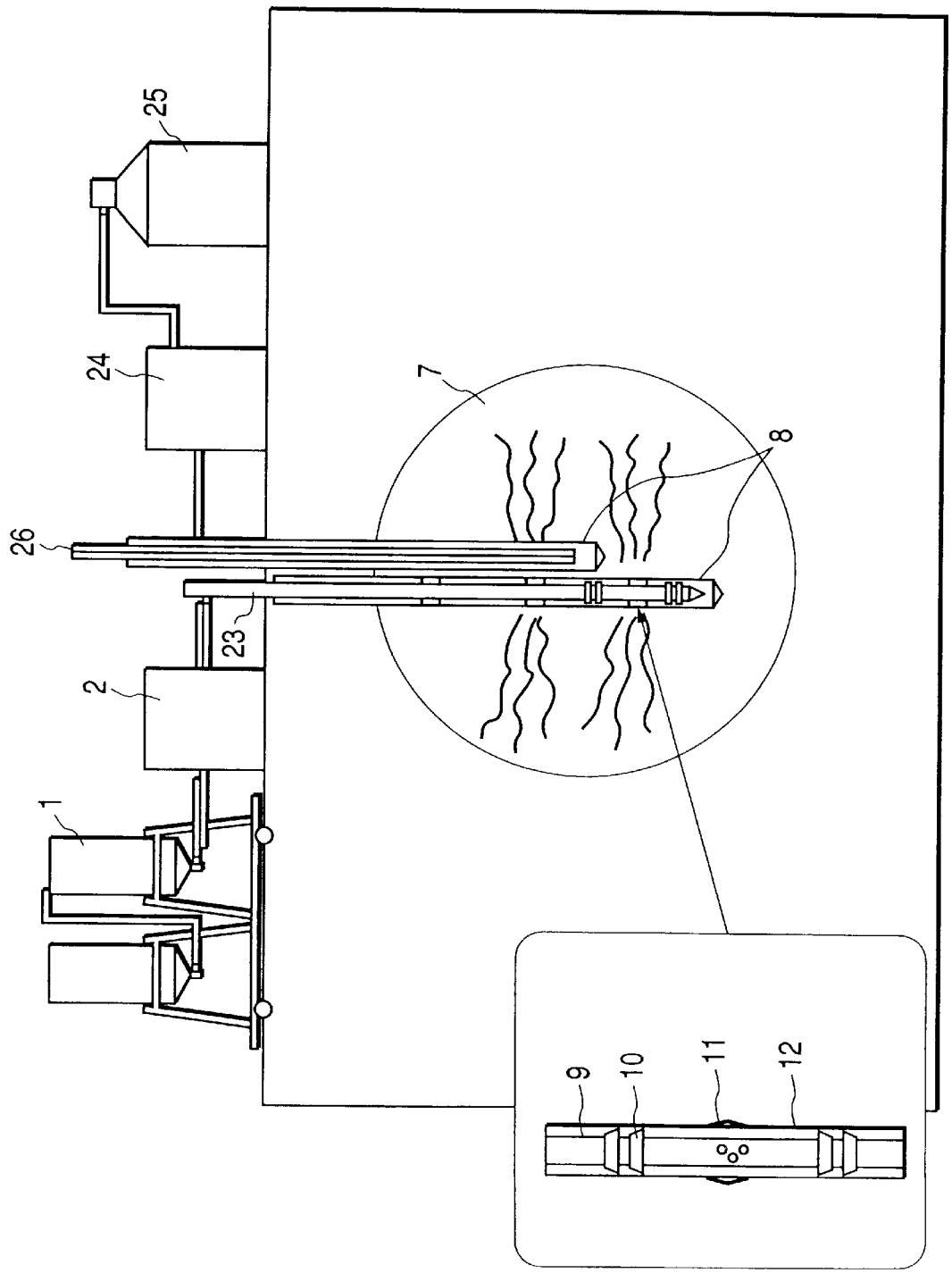
FIG. 2 is a schematic diagram illustrating a second embodiment of the present invention.

FIG. 2 is a schematic diagram illustrating another embodiment according to the present invention.

As in FIG. 1, region 7 of a contaminated soil to be remedied is previously determined based on the boring data etc., and then prepared are a container 1 containing a liquid agent to be injected into region 7, an injection system 2 consisting of a pump and a flow meter, an injection pipe 23 for injecting the liquid agent into the soil or a pressure-injection pipe for injecting water or air connected with the injection system 2, a refrigerant supply source 25, and a feeder 24 for supplying the refrigerant, as well as a freeze pipe 26 connected to the feeder 24 to freeze the soil. The injection pipe 23 and the freeze pipe 26 are respectively built in wells 8 dug in the region 7. As described below, by using an injection pipe having an injection opening of which position is movable along the length, and a semi-fixed freeze pipe, the region to be frozen and subjected to the liquid agent injection can be changed in depth to carry out the present remediation process while varying depth in the soil. In FIG. 2, the same pipe is used as a pressure-injection pipe for forming cracks and an injection pipe for injecting a liquid agent for microbial decomposition, but they may be prepared separately.

As shown in FIG. 2, it is convenient to use an injection pipe having packers 10 which allow to set the depth of injection, and between the double packers a rubber sleeve 11 which serves as an ejection opening to inject a liquid agent therethrough, since such an injection pipe enables the selection of the sites for liquid injection as well as the concomitant crack formation and liquid injection. The amount of the liquid agent to be injected and the injection pressure may be set according to the soil texture and size of the region desired to be injected with the liquid agent.

In the following examples are described several embodiments to illustrate the present invention. However, it is to be understood that the invention is not intended to be limited to the specific embodiments.

EXAMPLE 1

A hundred grams of fine sand was put in a 68 ml glass vial and tamped with a glass rod, and then water saturated with trichloroethylene (TCE) was added to an initial TCE concentration of about 10 ppm. The vial was sealed with a butyl rubber stopper lined with Teflon and a aluminum cap. Ten vials were prepared as above and stored for two weeks. Acetone and dry ice were put in a container, in which 5 of the above 10 vials were soaked till the content got frozen. Then the vials were taken out from the acetone and dry ice, and left to stand at room temperature for 10 minutes.

Separately, strain JM1 (FERM BP-5352) was grown with shaking at 15° C. in M9 medium (6.2 g of $Na_2HPO_4$, 3.0 g of $KH_2PO_4$, 0.5 g of NaCl and 1.0 g of $NH_4Cl$ per liter) supplemented with 0.5% sodium glutamate.

Ten milliliters of the cell suspension was injected by inserting a syringe into the consolidated soil of each of ten vials including those frozen or not frozen. Every other hour from immediately after the injection of the cell suspension, gaseous TCE in the head space of each vial was taken with a gas-tight syringe, and TCE concentration was measured by gas chromatography (Shimadzu Gas Chromatograph GC-14B: FID Detector) (Head Space Method). The elapsed time from the start until the residual TCE concentration became 0.1 ppm or less was taken for each vial of freezing treatment group and no treatment group. The average of five for each group was 9.2 hours and 13.8 hours, respectively. The result shows that TCE was decomposed faster in the once frozen soil than in not-frozen soil.

EXAMPLE 2

In the same manner as in Example 1, prepared were 10 vials each containing tamped soil contaminated with TCE, and 5 of the 10 vials were frozen.

Strain JMC1 (FERM BP-5960) was grown in the same manner as in Example 1, and 10 ml of the cell suspension was injected with a syringe into each frozen vial while the soil was still frozen. Also 10 ml of the cell suspension was injected to each non-frozen vial.

All the vials injected with the cell suspension were stored in a container kept at 5° C., and TCE concentration of each sample was measured by the head space method every hour. The elapsed time from the start until the residual TCE concentration became 0.1 ppm or less was taken for frozen and not frozen vials, and the averages of five for each group were 19.4 hours and 24.8 hours, respectively. The result clearly shows that the efficiency of soil remediation was higher in the frozen soil than in the non-frozen soil.

EXAMPLE 3

To fine sand of 12% water content, phenol was added to a phenol concentration of about 200 ppm. Then, 50 g of the fine sand was filled into each of ten 100 ml beakers. Five of the 10 samples were subjected to freezing in the same manner as in Example 1, and left to stand for 10 minutes at room temperature. *Pseudomonas cepacia* KK01 (FERM BP-4235), a strain capable of decomposing phenol, was grown in M9 medium containing 0.05% yeast extract, and 20 ml of the cell suspension (about $10^8$ cfu/ml) was added to each of the above beakers. Phenol concentration of the sand was measured every hour in accordance with JIS Method (JIS K012-1993, 28. 1). The elapsed time from the start until the residual phenol concentration became 0.5 ppm was taken and the averages for the once frozen and the non-frozen groups were 21.4 hours and 23.8 hours, respectively. The result shows that the efficiency in decomposition was also promoted by freezing soil.

EXAMPLE 4

Test Vessel

Figure 3:
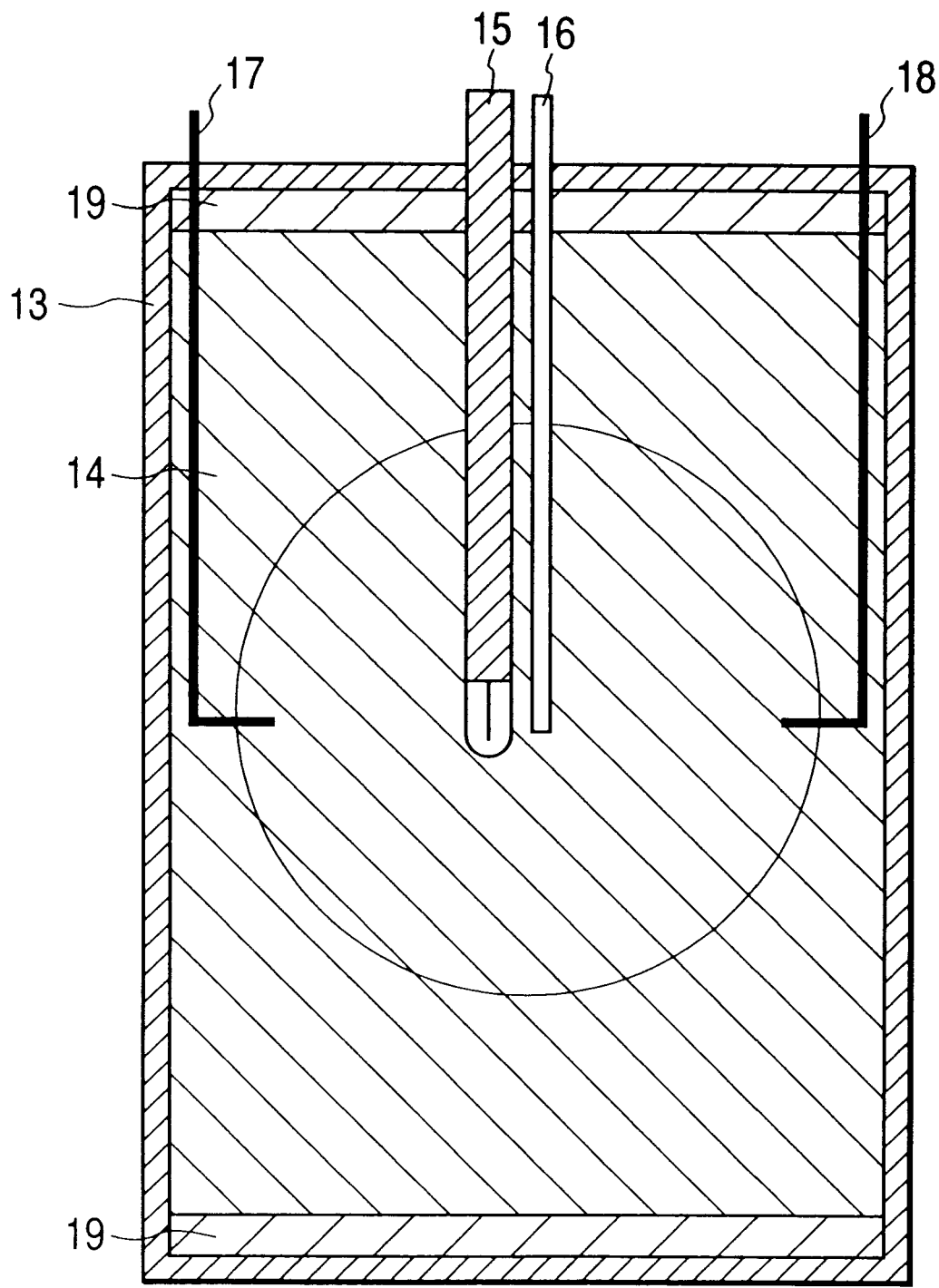
FIG. 3 is a schematic cross sectional view of a test vessel used in Example 4.

As shown in FIG. 3, a gravel layer 19 was provided as a bottom layer (0.1 m) in a cylindrical test vessel 13 (a drum: about 600 mm in diameter, about 850 mm in height), and a mixture of fine sand and silt containing 10 ppm of trichloroethylene (mixing ratio; fine sand:silt=8:2) was filled on the above gravel layer as a contaminated soil layer 14. While filling the contaminated soil, a freeze pipe 15 in which liquid nitrogen could circulate and an injection pipe 16 having on its sides four openings covered with a rubber sleeve were both built into the test vessel so that the freezing region and injection region would come to the center of the test vessel. Also, as gas sampling pipes, two stainless steel pipes 17 and 18, those of 1/18 inch inside diameter and covered with a stainless steel mesh at the tips, were built into the test vessel 10 cm inside from the side wall. The uppermost part of the test vessel was filled with a gravel layer 19 and covered with a lid. The lid was provided with an air vent for bypassing the internal pressure to be opened during freezing or injection of the cell suspension. The same vessel as the above test vessel except that a freeze pipe 15 was not built in was prepared as a control vessel.

Liquid nitrogen was circulated in the freeze pipe of the test vessel to freeze the test soil, and then the frozen soil was left to stand until it thawed. Injection of Cell Suspension and Measurement Strain JM1 was cultured using a 50 liter jar fermentor (Mitsuwa Biosystem Co., Ltd.: KMJ-501MGU-FPM II) in M9 medium supplemented with 0.5% sodium glutamate at 15° C. Cells in its late logarithmic growth phase were harvested by centrifugation after 45 hour culture, and re-suspended in M9 without any carbon source so as to provide a suspension of resting cells to be injected.

Figure 5:
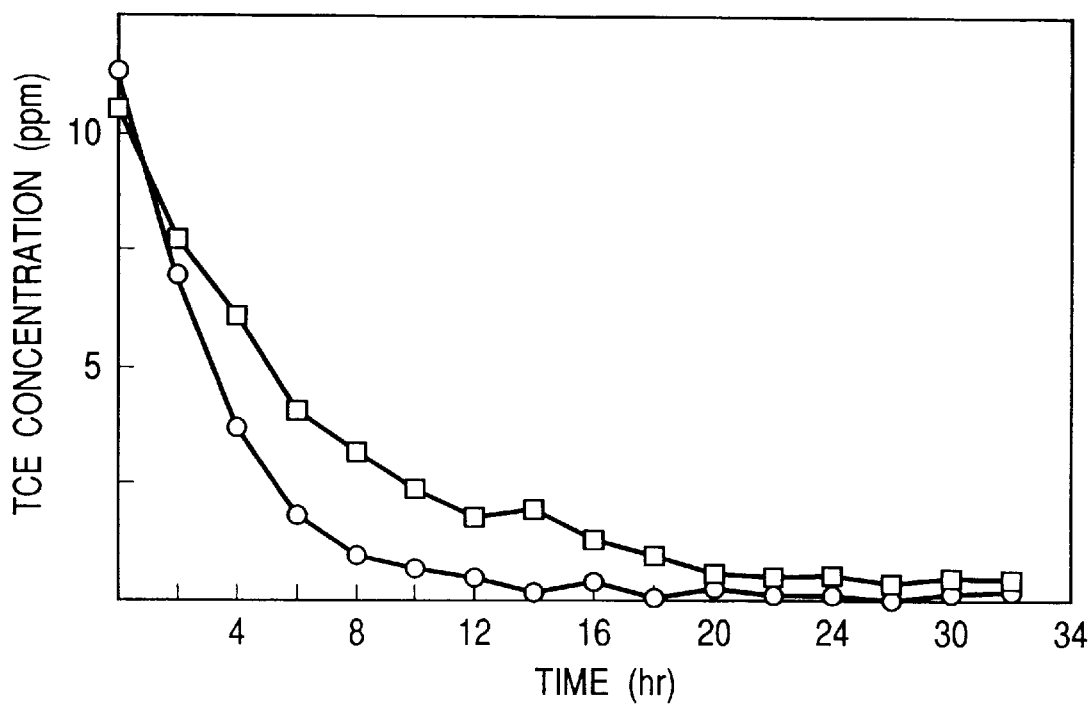
FIG. 5 is a graph showing the change of trichloroethylene concentration with time in the test vessel and the control vessel of Example 4.

Total 20 liters of the cell suspension was injected to both the test vessel and the control vessel from an injection pipe by a feeding pump at a feed rate of 1 to 10 liters/min. After that, the gas in the soil was sampled via gas sampling pipes and the TCE concentration was measured with a detector (Gastec Service, Inc.: 132L). The results are shown in FIG. 5. In the figure, open circle indicates an average of the data at two sampling points in the test vessel, and open square indicates the average of the data at two sampling points in the control vessel. The result shows that TCE was decomposed faster in the test vessel than in the control vessel and the efficiency in TCE decomposition was promoted in the test vessel.

EXAMPLE 5

In this example, the subject contaminated soil was a soil polluted with petroleum left in the ground. A freeze pipe in which liquid nitrogen could flow and a pressure-injection pipe having on its sides four openings covered with a rubber sleeve were both inserted in the contaminated soil. Then, liquid nitrogen was led in the freeze pipe so as to freeze the polluted soil, then compressed air was fed intermittently to the soil through the pressure-injection pipe. After that, the soil was left to stand for thawing.

HYDROBAG (POLYBAC CORP.), a microbial agent for petroleum decomposition was added to water in a ratio of 100 g to 1 liter, and a nutrient source was prepared to a C:N:P ratio of 100:10:1. Eight hundred liters of the above liquid microbial agent was injected to the soil from the pressure-injection pipe. Air was also fed from the pressure-injection pipe for about 5 hours everyday. After one month's air feeding time, the soil was sampled at 10 sampling points in the subject polluted soil and the TPH (total petroleum hydrocarbon concentrations) was determined in accordance with EPA8015M.

The TPH of the soil was 12200 ppm before treatment, and with a remediation process according to the present invention, 97.8–99.5%, about 99% on average of the petroleum pollution was removed from soil.

COMPARATIVE EXAMPLE 1

Remediation experiment was carried out in the same manner as in Example 5, except that only a pressure injection pipe having on its sides four openings covered with a rubber sleeve was introduced into a polluted soil layer similar to that of in Example 5.

The TPH of the soil was 13200 ppm before treatment, and after the treatment, 77.8–96.5%, about 92% on average, of the petroleum pollution was removed from the soil.

The results obtained from Example 5 and Comparative Example 1 show that, the soil remediation process according to the present invention enables 99% or more of removal the petroleum from the polluted soil, characterized by very uniform treatment.

EXAMPLE 6

Test Soil

To 100 g of a mixture of fine sand and silt (mixing ratio; fine sand:silt=8:2), 0.2 g of N-hexadecane, as a pollutant, was added to prepare a model contaminated soil. Then 50 mg of yeast extract was added to the model soil, and the soil was left to stand at room temperature for one month. As a control, a contaminated soil with no yeast extract was prepared, and also left to stand at room temperature for one month. N-hexadecane in each contaminated soil was extracted with N-hexane, and N-hexadecane content of each contaminated soil was measured by TCD gas chromatography in accordance. The result shows that N-hexadecane was decomposed faster in the contaminated soil when yeast extract was present. This indicates that there existed a microorganism(s) capable of decomposing N-hexadecane in the soil used in this experiment.

Test Vessel

Figure 4:
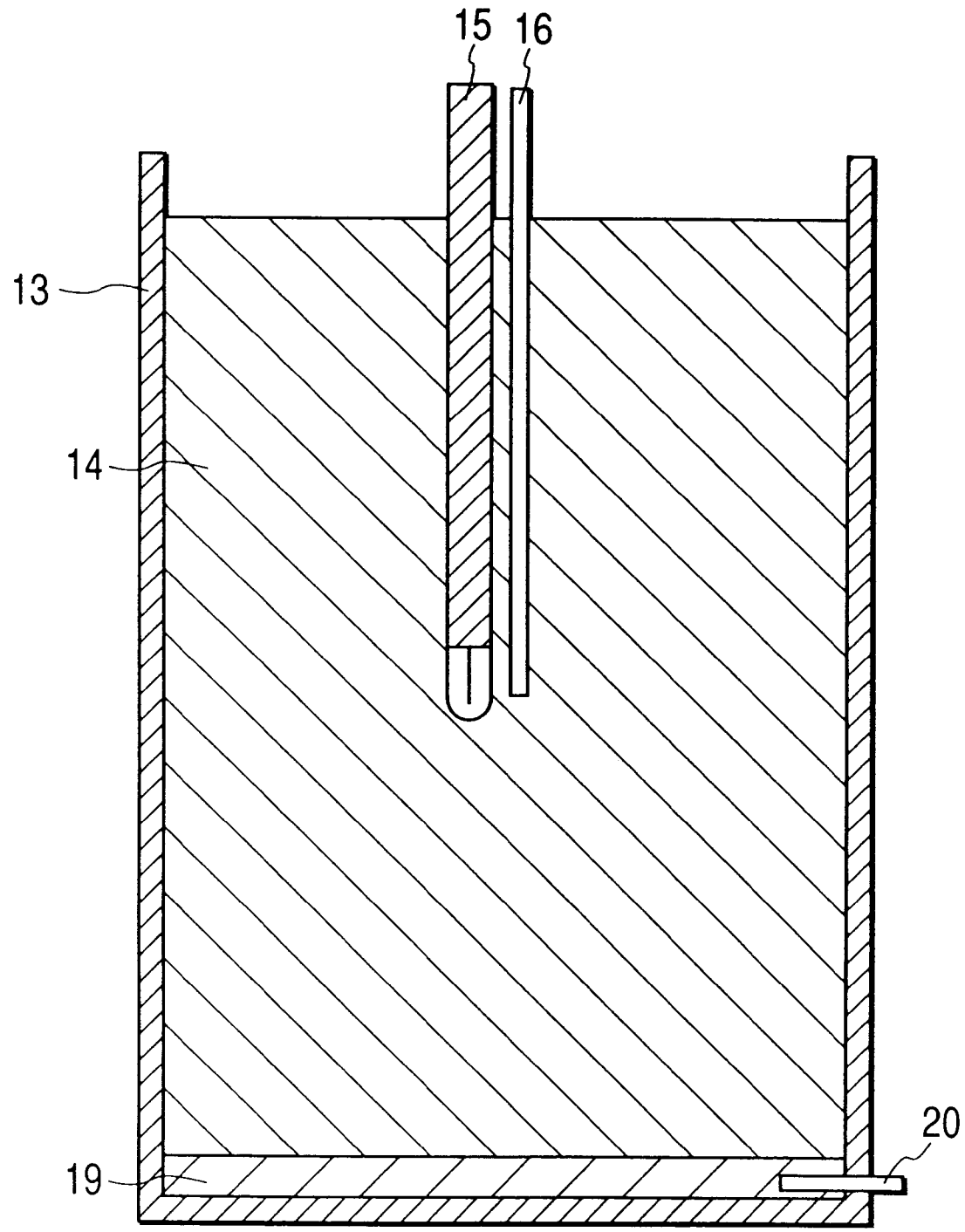
FIG. 4 is a schematic cross sectional view of a test vessel used in Example 6.

As shown in FIG. 4, a gravel layer 19 was provided as a bottom layer (0.1 m) in a cylindrical test vessel 13 (a drum: about 300 mm in diameter, about 850 mm in height), and the test soil prepared above (50 mg N-hexadecane/100 g soil) was filled on the above gravel layer as a contaminated soil layer 14. While filling the contaminated soil, a freeze pipe 15 in which liquid nitrogen could flow and an injection pipe 16 having on its sides four openings covered with a rubber sleeve were both built into the test vessel so that the freezing region and injection region would come to the center of the test vessel. The same vessel as the above test vessel except that a freeze pipe 15 was not built in was prepared as a control vessel.

Test soil was frozen by circulating liquid nitrogen in the freeze pipe of the test vessel, and the frozen soil was left to stand until it thawed. Then compressed air was fed intermittently to the soil through the pressure injection pipe 16.

Injection of Liquid Agent and Measurement of Pollutant

A nutrient source was prepared by dissolving yeast extract in water to a concentration of 50 mg/l. Five liters of the above liquid nutrient was injected to each of the test and control vessels through the pressure injection pipe. Then water gathered in the bottom was drained through a drain 20 provided in the bottom of the vessels. Air was fed to the soil through the pressure injection pipe for about 5 hours everyday. After 30 days' aeration, the soil was sampled from the test vessel as well as the control vessel, and the content of N-hexadecane remained in the soil was measured as mentioned above. The soils were sampled at 10 sampling points in almost the same site of each of the test vessel and the control vessel. The residual N-hexadecane content in the sampled soils are shown in Table 1 below. The measured values are shown in the equivalents in 100 g of the soil.

TABLE 1

Residual N-hexadecane (g)

|   | Soil of Test Vessel | Soil of Control Vessel |
|---|---|---|
| 1 | 0.001 | 0.08 |
| 2 | 0.002 | 0.07 |
| 3 | 0.001 | 0.01 |
| 4 | 0.004 | 0.07 |
| 5 | 0.002 | 0.05 |
| 6 | 0.005 | 0.02 |
| 7 | 0.003 | 0.09 |
| 8 | 0.002 | 0.02 |
| 9 | 0.004 | 0.06 |
| 10 | 0.005 | 0.01 |

It is clear from the above result that the efficiency of pollutant decomposition is improved by conducting the step of freezing a contaminated soil, the conducting the step of injecting a nutrient to the soil after thawing the soil.

EXAMPLE 7

A 100 g sample was taken from a subject contaminated soil to be treated, and 50 mg of yeast extract as added to the sample soil as a nutrient source, and the soil was left to stand for one month. A sample was also prepared to which yeast extract was not added. The TPH (total petroleum hydrocarbon concentrations) was determined for both samples in accordance with EPA8015M. By comparing the TPH values of both sample soils, it was confirmed that the concentration of the petroleum hydrocarbon pollutant was reduced faster in the soil with a nutrient source. This indicates that there existed a microorganism(s) capable of decomposing the petroleum hydrocarbon pollutant in the subject contaminated soil.

A freeze pipe and a pressure-injection pipe were both inserted in the contaminated soil as in Example 5. Then, liquid nitrogen was led into the freeze pipe so as to freeze the polluted soil, then compressed air was fed intermittently to the soil through the pressure-injection pipe. After that, the soil was left to stand for thawing.

A nutrient source was prepared by dissolving yeast extract in water to a concentration of 50 mg/l. Eight hundred liters of the above liquid nutrient was injected to the soil from the pressure-injection pipe. Air was also fed from the pressure-injection pipe for about 5 hours everyday. After one month's air feeding time, the soil was sampled at 10 sampling points in the subject polluted soil and the TPH (total petroleum hydrocarbon concentrations) was determined in accordance with EPA8015M.

The TPH of the soil was 3200 ppm before treatment, and with a remediation process according to the present invention, 92.8–97.5%, about 96% on average of the petroleum pollution was removed from soil.

COMPARATIVE EXAMPLE 2

Remediation experiment was carried out in the same manner as in Example 7, except that only a pressure injection pipe having on its sides four openings covered with a rubber sleeve was introduced into a polluted soil layer similar to that of in Example 7.

The TPH of the soil was 3180 ppm before treatment, and 77.6–97.3%, about 83% on average, of the petroleum pollution was removed after the treatment.

The results obtained from Example 7 and Comparative Example 2 show that, the soil remediation process according to the present invention enables 90% or more of removal of the petroleum from the polluted soil, characterized by very uniform treatment.

EXAMPLE 8

A sample was taken from a soil contaminated with TCE to be treated and the sample soil was left to stand in the 2% methane gas atmosphere over one month. A sample was also taken at the same time to which methane gas was not added. One month later, TCE concentration was measured for both samples. By comparing the TCE concentrations of both sample soils, it was confirmed that the TCE concentration was reduced faster in the soil treated with methane. This indicates that there existed a microorganism(s) capable of decomposing trichloroethylene in the subject contaminated soil.

A freeze pipe and a pressure-injection pipe were both inserted in the contaminated soil as in Example 5. Then, liquid nitrogen was led into the freeze pipe so as to freeze the polluted soil, then compressed air was fed intermittently to the soil through the pressure injection pipe. After that the frozen soil was left to stand for thawing.

Then 2% methane gas was fed to the thawed soil at a rate of 50 liter/min for about 5 hours everyday. After 3 months' methane gas feeding, soil water was sampled at 10 sampling points of the contaminated soil. The sampled liquid was immediately put into a container containing 5 ml of n-hexane, and the mixture was agitated for 3 minutes followed by separation of the n-hexane layer. TCE content was measured by ECD gas chromatography.

The TCE concentration of the soil was 1.2 ppm before treatment, and with a remediation process according to the present invention, 92.8–98.5%, about 96% on average of the TCE pollution was removed from soil.

COMPARATIVE EXAMPLE 3

A remediation experiment was carried out in the same manner as in Example 8 except that only a pressure injection pipe having on its sides four openings covered with a rubber sleeve was inserted into a contaminated soil layer.

The TCE concentration of the soil was 1.2 ppm before treatment, and after the treatment, 82.6–97.3%, about 89% on average, of the TCE pollution was removed from the soil.

The results obtained from Example 8 and Comparative Example 3 showed that, the remediation process according to the present invention enables 90% or more of removal of TCE from the polluted soil, characterized by very uniform treatment.

EXAMPLE 9

An experiment was conducted in the same manner as in Example 1 except that a mixed soil of fine sand and silt (fine sand:silt=2:8) was used. The elapsed time from the start until the residual TCE concentration became 0.1 ppm or less was taken for each vial of freezing treatment group and no treatment group. The average of five for each group was 14.3 hours and 20.5 hours, respectively. The result shows that TCE was decomposed faster in the once frozen soil than in not-frozen soil.

EXAMPLE 10

An experiment was conducted in the same manner as in Example 2 except that a mixed soil of fine sand and silt (fine sand:silt=2:8) was used. The elapsed time from the start until the residual TCE concentration became 0.1 ppm or less was taken for each vial of freezing treatment group and no treatment group. The average of five for each group was 21.4 hours and 28.6 hours, respectively. The result shows that TCE was also decomposed faster in the once frozen soil than in not-frozen soil.

EXAMPLE 11

An experiment was conducted in the same manner as in Example 3 except that a mixed soil of fine sand and silt (fine sand:silt=2:8) was used. The elapsed time from the start until the residual phenol concentration became 0.5 ppm or less was taken for each vial of freezing treatment group and no treatment group. The average of five for each group was 31.5 hours and 38.2 hours, respectively. The result shows that phenol was decomposed faster in the once frozen soil than in not-frozen soil.

EXAMPLE 12

Figure 6:
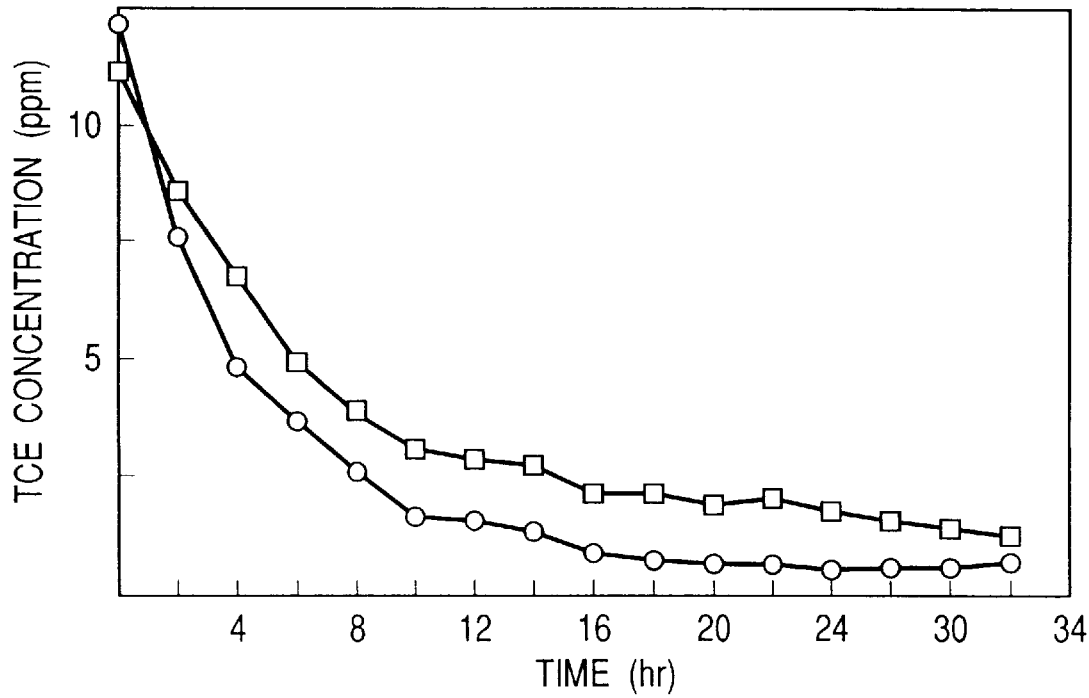
FIG. 6 is a graph showing the-change of trichloroethylene concentration with time in the test vessel and the control vessel of Example 12.

An experiment was conducted in the same manner as in Example 4 except that a mixture of fine sand and silt (fine sand:silt=2:8) was used. The results are shown in FIG. 6. In the figure, open circle indicates the average of data at two sampling points of the frozen soil in the test vessel, and open square indicates the average of data at two sampling points in the control vessel. It is clear that even in the case of clay soil of a high silt content, TCE could be efficiently decomposed by conducting the step of freezing of the soil before injecting a microorganism to the soil in order to uniformly distribute the microorganism in the soil.

EXAMPLE 13

An experiment was carried out in the same manner as in Example 6 except that the mixing ratio of fine sand to silt was 2:8. The results are shown in Table 2 below.

TABLE 2

| | Residual N-hexadecane (g) | |
|---|---|---|
| | Soil of Test Vessel | Soil of Control Vessel |
| 1 | 0.003 | 0.10 |
| 2 | 0.005 | 0.05 |
| 3 | 0.005 | 0.08 |
| 4 | 0.006 | 0.07 |
| 5 | 0.002 | 0.03 |
| 6 | 0.007 | 0.02 |
| 7 | 0.008 | 0.07 |
| 8 | 0.006 | 0.04 |
| 9 | 0.005 | 0.02 |
| 10 | 0.009 | 0.04 |

It is evident from the above results that, even in the case of clay soil, efficiency in decomposition of a pollutant is promoted by conducting the step of freezing of a contaminated soil prior to the step of injecting a nutrient to the soil.

The present invention enables more effective biological treatment of a contaminated region of the soil by conducting the step of freezing the contaminated region of the ground prior to the step of injecting to the region a microorganism capable of decomposing a pollutant and/or a liquid agent or a gas required for introducing an ability to decompose a pollutant in the microorganism; which has led to realization of more efficient and more rapid remidiation.

In addition, according to the present invention, the effect of a liquid agent or gas injected to the contaminated soil to enhance the decomposition activity is remarkably improved by conducting a step of freezing the contaminated soil, a step of thawing the frozen soil and a step of making cracks in the soil by applying pressure thereto; which has made possible more efficient biological treatment of a contaminated soil and led to realization of more efficient and more rapid remediation work.

What is claimed is:

1. A process for remedying a soil contaminated with a pollutant comprising the steps of:

(a) forming a frozen region in a soil contaminated with a pollutant;

(b) introducing at least one of a microorganism capable of decomposing the pollutant, an inducer for making a microorganism express an ability to decompose the pollutant or a nutrient for growth of a microorganism capable of decomposing the pollutant, into the frozen region; and (c) decomposing the pollutant by employing a microorganism in the frozen region.

2. The process according to claim 1, wherein the step (b) is conducted so that the frozen region is thawed.

3. A process for remedying a soil contaminated with a pollutant comprising the steps of:

(a) forming a frozen region in a soil contaminated with a pollutant;

(b) thawing the frozen region;

(c) introducing at least one of a microorganism capable of decomposing the pollutant, an inducer for making a microorganism express an ability to decompose the pollutant or a nutrient for growth of a microorganism capable of decomposing the pollutant, into a thawed region resulting from the step (b); and (d) decomposing the pollutant by employing a microorganism in the thawed region.

4. The process according to claim 1 or 2, further comprising a step for applying pressure to the frozen region between the step (a) and (b).

5. The process according to claim 3, further comprising a step for applying pressure to the frozen region or the thawed region conducted between the step (a) and (c).

6. A process for remedying a soil contaminant with a pollutant comprising the steps of:

(a) freezing the soil and forming a soil region where pore space in the soil expands;

(b) introducing at least one of a microorganism capable of decomposing the pollutant, an inducer for making a microorganism express an ability to decompose the pollutant or a nutrient for growth of a microorganism capable of decomposing the pollutant, into the soil region;

(c) diffusing at least one of the microorganism, the inducer or the nutrient in the soil region; and (d) decomposing the pollutant by employing a microorganism in the soil region.

7. The process according to claim 1 or 3, wherein the soil contains a indigenous microorganism having an ability to decompose the pollutant on induction and the step (b) is a step for feeding to the soil at least one of an inducer for making the indigenous microorganism express the ability and a nutrient for growth of the indigenous microorganism.

8. The process according to claim 1 or 3, wherein the microorganism capable of decomposing the pollutant is a microorganism constitutively expressing the ability to decompose the pollutant.

9. The process according to claim 8, wherein the pollutant is an aromatic compound or chlorinated aliphatic hydrocarbon compound and the microorganism is strain JM1 (FERM BP-5352).

10. The process according to claim 8, wherein the pollutant is an aromatic compound or chlorinated aliphatic hydrocarbon compound and the microorganism is strain JMC1 (FERM BP-5960).

11. The process according to claim 9, wherein the aromatic compound is phenol, toluene or cresol.

12. The process according to claim 9, wherein the chlorinated aliphatic hydrocarbon compound is dichloroethylene or trichloroethylene.

13. The process according to claim 1 or 3, wherein the nutrient is a carbon source which the microorganism can assimilate.

14. The process according to claim 1 or 3, wherein the nutrient is in a gaseous state.

15. The process according to claim 10, wherein the aromatic compound is phenol, toluene or cresol.

16. The process according to claim 10, wherein the chlorinated aliphatic hydrocarbon compound is dichloroethylene or trichloroethylene.

17. The process according to claim 6, wherein the step (a) comprises the sub-step of applying pressure after freezing the soil.

18. The process according to claim 6, wherein the step (a) comprises the sub-step of thawing the soil after freezing the soil.

19. The process according to claim 18, wherein the sub-step further comprises applying pressure to the thawed soil.

20. The process according to claim 6, wherein the microorganism is an indigenous microorganism capable of decomposing the pollutant.

* * * * *